US006330552B1

(12) United States Patent
Farrar et al.

(10) Patent No.: US 6,330,552 B1
(45) Date of Patent: Dec. 11, 2001

(54) DATABASE QUERY COST MODEL OPTIMIZER

(75) Inventors: Christopher M. Farrar, Los Gatos; Harry A. Leslie, Los Altos, both of CA (US); Pedro Celis, Austin, TX (US); Diana L. Shak, San Jose, CA (US); Jay H. Vaishnav, Cupertino, CA (US); Michael J. Skarpelos, San Jose, CA (US)

(73) Assignee: Compaq, Cupertino, CA (US)

( * ) Notice: Subject to any disclaimer, the term of this patent is extended or adjusted under 35 U.S.C. 154(b) by 0 days.

(21) Appl. No.: 09/162,638

(22) Filed: Sep. 28, 1998

(51) Int. Cl.$^7$ ....................................... G06F 17/60
(52) U.S. Cl. ................... 705/400; 707/1; 707/2
(58) Field of Search ................. 705/400; 707/1, 707/2

(56) References Cited

U.S. PATENT DOCUMENTS

| | | | |
|---|---|---|---|
| 5,301,317 | * 4/1994 | Lohman et al. | 707/2 |
| 5,367,675 | 11/1994 | Cheng et al. | 395/600 |
| 5,546,570 | 8/1996 | McPherson, Jr. et al. | 395/600 |
| 5,548,755 | 8/1996 | Leung et al. | 395/600 |
| 5,619,692 | 4/1997 | Malkemus et al. | 395/602 |
| 5,630,120 | 5/1997 | Vachey | 395/602 |
| 5,689,696 | 11/1997 | Gibbons et al. | 395/601 |
| 5,689,708 | * 11/1997 | Regnier et al. | 709/229 |
| 5,761,654 | 6/1998 | Tow | 707/2 |
| 5,765,146 | * 6/1998 | Wolf et al. | 707/2 |
| 5,875,445 | * 2/1999 | Antonshenkov | 707/2 |
| 6,023,695 | * 2/2000 | Osborn et al. | 707/3 |
| 6,026,391 | * 2/2000 | Osbourn et al. | 707/2 |
| 6,212,514 | * 4/2001 | Eberhard et al. | 707/2 |

FOREIGN PATENT DOCUMENTS 11-203288  *  7/1999  (JP).

OTHER PUBLICATIONS

IBM Technical Disclosure Bulletin: "Effective Approach to Query I/O Parallelism Using Sequential Prefetch and Horizontal Data Partitions"; Sep. 1993, vol. 36, No. 9A, pp. 541–544.*

Batabase Searcher: "Advance cost estimates on DIALOG for search results. (Price Watch)"; Jul.–Aug. 1991, v7, n6, p. 38.*

Spiliopulou et al: "A cost model for the estimation of query execution time in parallel environment supporting pipelines"; Computers ans Artificial Intelligence, 1996, vol. 15, No. 4, pp. 341–368, (Abstract Only).*

Subramanian et al: "Query optimization in multidatabase systems"; Distributed and Parallel Databases, Apr. 1998, vol. 6, No. 2, pp. 183–210, (Abstract Only).*

Article by Clifford A. Lynch entitled "Selectivity Estimation and Query Optimization in Large Databases with Highly Skewed Distributions of Column Values" published by University of California dated 1988 pp. 240–251.

Article by Piatetsky–Shapiro et al. entitled "Accurate Estimation of the Number of Tuples Satisfying a Condition" published by ACM dated 1984 pp. 256–276.

(List continued on next page.)

Primary Examiner—Edward R. Cosimano
(74) Attorney, Agent, or Firm—Fenwick & West LLP

(57) ABSTRACT

A method and apparatus is disclosed for accurately estimating the cost of a database query, including the total computer resources used and estimated elapsed time for the production of a first row and last row of an operator involved in the query and/or the total resources used and elapsed time for returning the overall response to a database query. The method and apparatus accurately accounts for resources used and elapsed time associated with blocking operators, such as sorts and hash joins, which cannot produce a first row until they have completed their operations.

8 Claims, 7 Drawing Sheets

OTHER PUBLICATIONS

Article by Haas et al. entitled "Sampling–Based Estimation of the Number of Distinct Values of an Attribute" published by Proceedings of the 21$^{st}$ VLDB Conference dated 1995 pp. 311–321.

Article by Yannis E. Ioannidis entitled "University of Serial Histograms" published by Proceedings of the 19th VLDB Conference dated 1993 pp. 256–267.

Article by Mackert et al. entitled "R* Optimizer Validation and Performance Evaluation for Distributed Queries" published by Proceedings of the 12$^{th}$ International Conference on Very Large Databases, dated 1986 pp. 149–159.

Article by Leonard D. Shapiro entitled "Join Processing in Database Systems with Large Main Memories" published by ACM Transactions on Database Systems dated 1986, vol. 11, No. 3, pp. 239–264.

Article by Selinger et al., entitled "Access Path Selection in a Relational Database Management System" published by ACM dated 1979, pp. 23–34.

Article by Sun et al. entitled: "An Instant and Accurate Size Estimation Method for Joins and Selection in a Retrieval–Intensive Environment." SIGMOD, May 1993, pp. 79–88.

Article by Poosala et al. entitled: "Improved Histograms for Selectivity Estimation of Range Predicates" SIGMOD Jun. 1996, pp. 294–305.

* cited by examiner

DATABASE QUERY COST MODEL OPTIMIZER

CROSS-REFERENCE TO RELATED APPLICATION

This application is related to the co-pending U.S. patent application Ser. No. 09/162,245 of Christopher M. Farrar, Harry A. Leslie, Pedro Celis and Diana L. Shak, entitled "Histogram Synthesis Modeler for a Database Query Optimizer," filed Sep. 28, 1998. This patent application is incorporated herein by reference.

BACKGROUND OF THE INVENTION

This invention relates to the field of database query optimizers, and more particularly, to an improved database query optimizer that can select a query plan based upon different performance goals, such as returning the first or last row of a query in the minimum amount of time, or minimizing the use of computer resources such as computer memory.

Computers have the capability of storing vast amounts of data. For example, computers can store and retain data related to thousands of employees of large multi-national corporations, including the departments in which they work, their employee numbers, salaries, job descriptions, geographical locations, etc. In order to extract selected pieces of that data from such large computerized databases, users can present a query to the database system in the form of an SQL statement. For example, an SQL statement may ask the database system to list the names of all employees having employee numbers 1001 to 2000. A properly structured SQL statement will result in a list of records that satisfy the question or "query." In this example, the query would produce the names of 1000 employees, assuming that the employees had sequential employee numbers.

Once the user inputs a query into the computer, an SQL compiler operates on the query to develop an efficient way to extract the desired information from the database. Typically, the compiler generates a large number of different, but logically equivalent, plans for executing the same query. These "plans" are typically represented in computer memory as query trees, wherein each node of the tree includes a relational operator, such as a "sort" or "merge" operator. "Relational operators" are operators that receive one or more tables as input and produce a new table as an output. Join, Union and Union All are examples of operators that receive two tables as inputs. Group-by and Sort are examples of relational operators that receive only one table as input, such as a "sort" or "merge" operator. The optimizer program selects the query tree with the lowest estimated cost to respond to the query. In database parlance, "cost" is usually measured in terms of the amount of computer resources utilized by the computer in executing the SQL statement, for example, the number of I/O's or CPU instructions.

A major problem with existing optimizers is that, in many cases, they do not properly estimate the cost of carrying out the query. For example, known optimizers first estimate the number of CPU instructions, I/O operations and, in distributed systems, the number of messages that would be needed to carry out the SQL statement. See, e.g., P. G. Selinger, et al., "Access Path Selection in a Relational Database Management System," Proceedings of the ACM-SIGMOD International Conference on Management of Data, June 1979, and L. F. Mackert and G. M. Lohman, "R* Optimizer Validation and Performance Evaluation for Distributed Queries," Proceeding of the Twelfth International Conference on Very Large Data Bases, Kyoto, Japan, August, 1986. Once the number of such instructions, I/O operators and messages is predicted, such optimizers assign a cost to each operator, add up the cost associated with the execution of each operator and thus produce a total predicted cost for the particular plan. The cost of various plans are calculated and compared. Then, the operator can select the lowest cost plan for execution.

Unfortunately, because the computer can conduct some operations in parallel while others must be conducted serially, these optimizers cannot properly predict which plan will produce the first row or the last row in a minimum amount of time. Minimizing the amount of time needed to produce the first or last row of a query is often more important than the cost of the query in terms of the physical resources utilized in executing the query. Thus, there is a need for an improved database cost model that accurately accounts for speed in returning an answer to a query as well as the resources utilized. In short, time may be the most important "cost" associated with a query.

Known prior art optimizers also do not properly account for memory utilization. In situations where the memory of the computer is limited and/or where the algorithm utilizes large amounts of data, memory utilization is an important parameter to consider in determining the cost of the query. It will be recognized that the execution of an SQL statement will cause the computer to utilize certain resources such as, for example, CPU instructions and disk seeks. These types of resources clearly have some elapsed time associated with their execution. Therefore, one can predict that, all else being equal, an SQL statement that requires more instructions and more seeks than another statement will take longer to return a row than the other statement. However, the relationship between memory utilization and elapsed time is much more complicated and not at all intuitive. For example, a statement that uses more memory may actually execute faster than one which uses less memory. This complicated relationship between memory utilization and elapsed time may be one of the reasons that prior art optimizers have failed to account for memory utilization.

In view of all of the above, there is a need for an improved optimizer. In particular, there is a need for an optimizer that can consider and account for flexible performance goals, such as how quickly a plan returns a first row, or a last row, or selecting a plan that will minimize the usage of certain types of computer resources, and one that properly accounts for memory utilization.

SUMMARY OF THE INVENTION

For most database queries, the requested information can be obtained in various ways. Each way of obtaining the information involves a series of operations on the database called a "plan." The present invention is directed to a method, and related software and devices, for use with database query optimizers, for calculating the cost of implementing various plans and selecting the plan that best accommodates the particular desired performance goals. For example, the optimizer of the present invention can choose plans based on one of at least three performance goals: elapsed time to produce the first row of a query, elapsed time to produce the last row of a query and total resource usage based on a user supplied weighting of resource components.

When a user inputs a query into the computer, the SQL compiler operates on the query statement to produce an executable query plan. The compiling process typically includes a number of discrete steps which are handled by different components of the compiler. First, a "parser" component verifies the syntax of the original SQL statement. If the syntax is correct, it produces a syntactically correct query tree. A "binder" component then checks the semantic content of the tree. Then, a "normalizer" component transforms the semantically correct query tree into canonical form. The canonical tree represents, typically, a very large number of logically equivalent ways of processing the query posed by the SQL statement. The "optimizer" component then operates on the canonical tree to generate a set of the logically equivalent query trees. According to the present invention, the optimizer then estimates the cost associated with carrying out each plan and selects the plan that best achieves the desired goal.

For the sake of clarity of explanation, the cost estimating process can be viewed as involving two phases. In the first phase, the downward portion of a depth-first query tree traversal, the optimizer assigns a "cost" to each operator in the query tree. A "cost" consists of a set of "resource vectors" which in turn represent resources utilized by the operator to satisfy a particular performance goal. The resources include CPU instructions, number of disk seeks, kilobytes of I/O transfers, normal and persistent memory utilized, number of messages and kilobytes transferred by those messages, temporary disk storage space used, the number of times the operator will be executed, and the amount of time the operator spends (i) waiting for results from descendent operators in the query tree and (ii) waiting caused by the use of multiple resources that can not be used concurrently. This last value, which measures types of waiting time, is called "blocking/idle time".

In the second phase of the process, known as cost roll-up, during the upward traversal of the query tree, the optimizer combines the costs associated with each node of the plan. The present invention includes a sophisticated vector algebra designed to accurately model the interaction between operators in the query tree when performing cost roll-up. Specifically, the roll-up formulas of the present invention use the sophisticated vector algebra to model the blocking behavior of some operators and also how operators in the query tree overlap. (A blocking operator must wait, i.e. "block", until it receives all rows from all its children before it can return a single row to its parent.) The cost roll-up formulas and the underlying vector algebra on which they are based are described below.

The present invention also includes various formula that allow elapsed time to be computed from the resource vectors, so that various plans can be evaluated, not only in terms of resource usage, but also in terms of elapsed time to produce a first or last row.

DETAILED DESCRIPTION OF THE PREFERRED EMBODIMENTS

An execution plan for a particular database query consists of relational operators forming the nodes of a query tree. Each operator in such a query tree has an associated cost. The optimizer of the present invention combines the costs associated with each operator in the query tree to produce the total cost of the query plan. The optimizer then uses these costs to determine, amongst many logically equivalent plans, the plan which best accommodates the desired goal. The optimizer selects this plan, and it may then be executed. As previously mentioned, the cost of the various operators is combined according to a special vector calculus. The "cost" of a plan may be described in terms of the total physical resources of the computer engaged in implementing the query, or it may be measured in terms of the time required to produce the first or last row of data resulting from the query.

Overview of the Computer System

Figure 1:
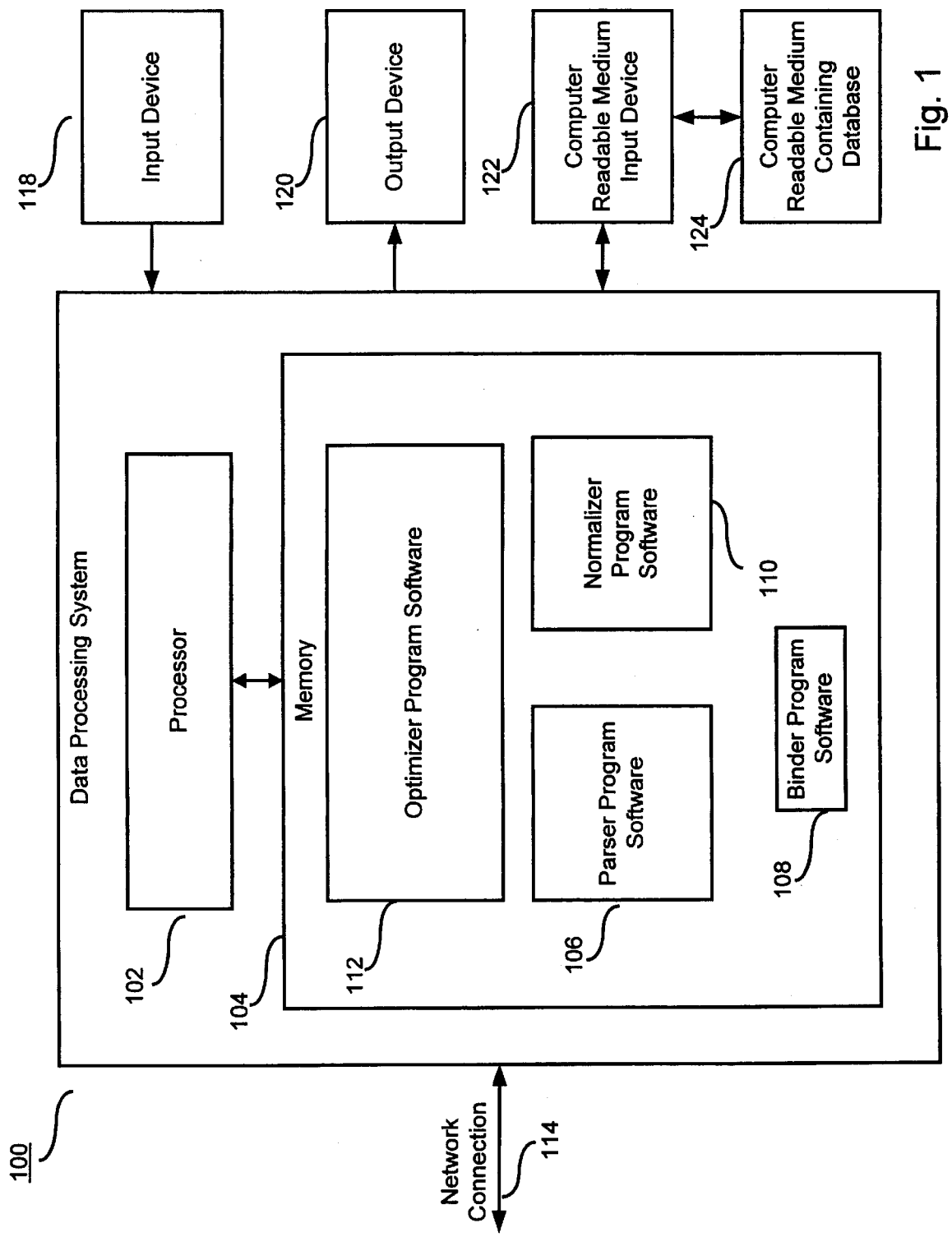
FIG. 1 is a block diagram of a computer system for implementing a preferred embodiment of the present invention.

The present invention may be implemented on a computer system, such as that illustrated in FIG. 1. FIG. 1 is a block diagram of a data processing system 100. The data processing system 100 has at least one processor 102 and associated computer memory 104. The memory 104 includes at least the "parser" 106, "binder" 108, "normalizer" 110 and "optimizer" 112 software components of the SQL compiler for implementing the tasks described herein. The steps of the described embodiments of the present invention may be performed when instructions contained in memory 104 are executed by processor 102.

System 100 also includes a network connection 114, such as a connection to a LAN or a WAN. System 100 includes an input device(s) 118 such as a keyboard, touch screen, or the like. System 100 includes an output device(s) 120 such as a printer, display screen or the like. System 100 also includes a computer readable medium input device 122 and a computer readable medium 124. Computer readable medium 124 can be any appropriate medium that has instructions and data stored thereon. These instructions are loaded from computer readable medium 124 into computer memory 104. Instructions can also be loaded into memory in the form of a carrier wave over network connection 114. Thus, the instructions and data in computer memory 104 can be loaded into memory via an input device, such as a network, a LAN or a WAN, or can be loaded from a computer readable medium such as a disk, tape or other appropriate computer readable media. The instructions comprising each of the software programs described herein can also be downloaded in the form of a carrier wave over a network connection.

System 100 includes an operating system (not shown). A person of ordinary skill in the art will understand that the memory 104 and computer readable media 124 may also contain additional information, such as other application programs, operating systems, other data, etc., which are not shown in the figure for the sake of clarity. It also will be understood that data processing system 100 (or any other data processing system described herein) can include numerous elements not shown in FIG. 1, such as additional data, software, and/or information in memory, disk drives, keyboards, display devices, network connections, additional memory, additional CPUs, LANs, input/output lines, etc.

Overview of the Inventive Process

Figure 2:
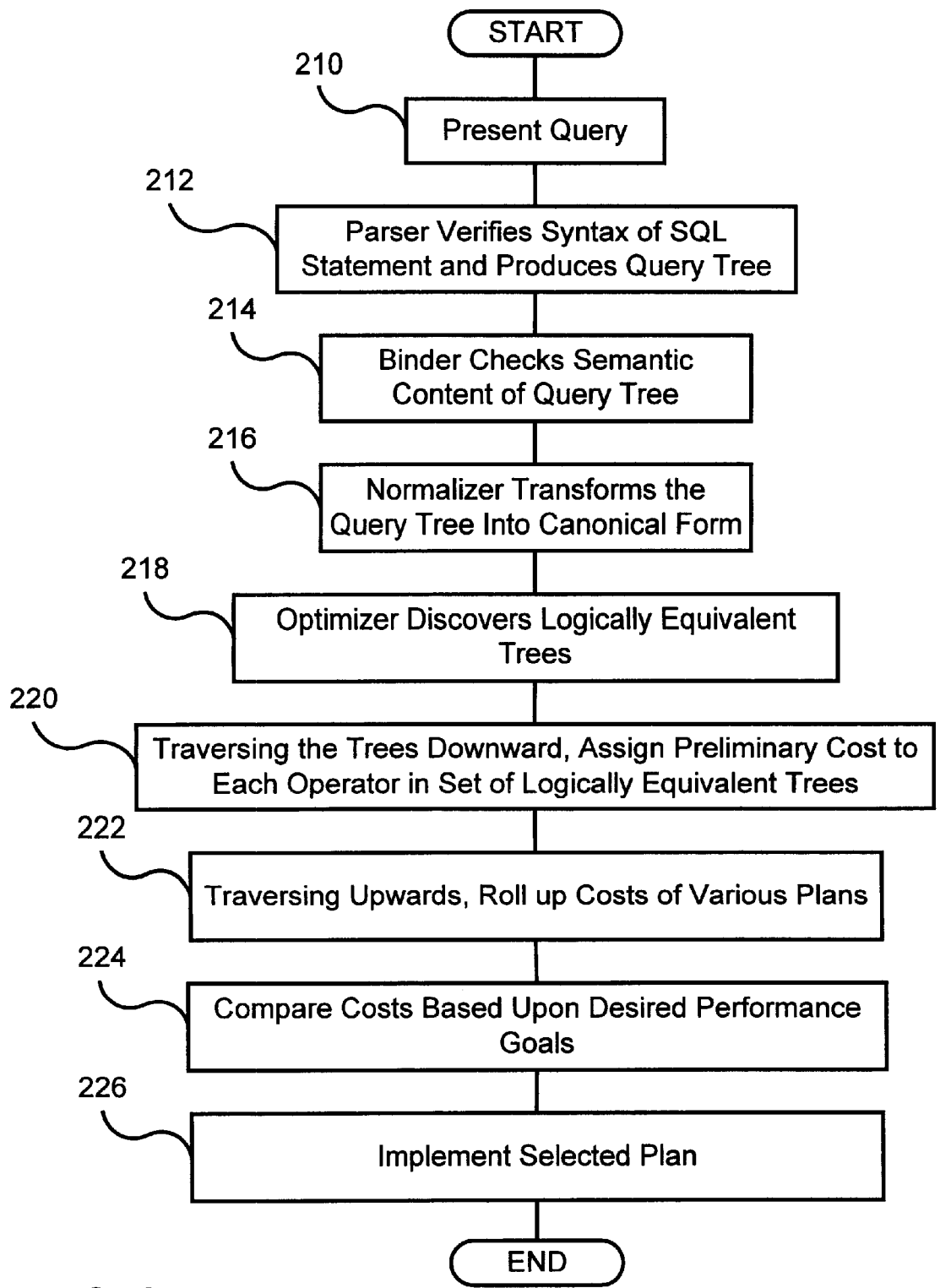
FIG. 2 is a flow chart illustrating the steps of a preferred embodiment of the present invention.

FIG. 2 illustrates a presently preferred process according to the subject invention. As shown in FIG. 2, a query in SQL format is first presented to the database system 210, for example via input device 118. The parser 106, binder 108, normalizer 110 and optimizer software 112 operate on the query statement, as set forth above and as illustrated at 212, 216 and 218, respectively, to generate a set of logically equivalent trees. Each node of these query trees represents a relational operator. Based upon the type of operator represented, the optimizer 112 assigns a preliminary cost 220 to that operator. The preliminary cost consists of a set of vectors that each represent the amount of resources the operator will use with respect to a particular performance goal while executing on behalf of the query. The optimizer combines the cost objects of all operators in the query tree according to the "roll-up" formulas described below and thus produces a cost for the overall query plan (222). After the optimizer compares the cost of logically equivalent plans and chooses the least expensive plan with respect to a specified performance goal 224 it delivers the selected plan to the database execution program which in turn implements 226 the selected plan.

Costing Primitives

This section describes the underlying costing primitives necessary for understanding subsequent roll-up formulas.

A Cost object consists of four SimpleCostVector objects which in turn each contain ten CostScalar objects as vector components. Each SimpleCostVector object measures an amount of resource usage. To determine the less expensive of two Cost objects, one must specify, not only the two Cost objects, but also a performance goal; two costs may compare differently depending on the specified performance goal.

A SimpleCostVector object consists of ten scalar components which respectively measure the following resource usage associated with a query operator:

1) CPU (cpu)

A count of CPU instructions. In the presently preferred embodiment, each unit value equates to 1000 machine instructions. Therefore, a value of 1 means 1000 machine instructions, 2 mean 2000 machine instructions, etc..

2) Seeks (s)

Number of random I/O's, e.g., the number of head positionings of a disk drive for sequential reads.

3) I/O Transfer (k)

Kilobytes of I/O transferred.

4) Normal Memory (nm)

Amount of memory (in Kilobytes) needed to hold working buffers, hash tables, etc., during the execution of an operator.

5) Persistent Memory (pm)

Amount of memory (in Kilobytes) which persists after operator completion.

6) Messages (m)

A count of the number of messages between processes running on different nodes in a cluster.

7) Message Transfer (mkb)

Number of Kilobytes transferred for all messages.

8) Temporary Disk Space (tds)

Amount of disk space (in Kilobytes) used for temporary files.

9) Repeat Count (rcount)

Also known as number of "probes." This value represents the number of times the operator will be executed. Typically, this value will be 1 (one), but in some cases (e.g. the inner scan of a nested loops join) it can be greater than one.

10) Blocking/Idle Time (blk_idlt)

The amount of time spent waiting for child operators in the expression tree.

Computing Elapsed Times for SimpleCostVector Objects

Given a resource vector, the formulas below may be used to compute the estimated elapsed time associated with a SimpleCostVector. In these formulas, FF(x) represents the weighting assigned to component x. FF(x) multiplied by x yields the elapsed time for component x. In the present embodiment of the invention, for each component x, FF(x) is determined empirically through a calibration process. The calibration process is performed by executing a query to determine its actual elapsed time and then adjusting the value of FF(x) until the cost model predicts the actual elapsed time for the execution of the query.

Page Fault Time $$pft=\max(0, nm-\text{physical\_memory})*FF(\text{normal\_memory\_page\_faults})$$

The elapsed time for page faults, pft, depends on available physical memory and the amount of normal memory used to execute the query. The term nm−physical_memory indicates the amount of normal memory which does not have physical memory underneath it and is thus subject to page faults. Of course, if available physical memory exceeds normal memory, then the formula should not result in a negative elapsed time. Therefore, max(0, nm−physical_memory) selects the maximum of zero or the value for nm−physical_memory to ensure that pft will always be non-negative.

CPU Elapsed Time $$cput=cpu*FF(cpu)+pft$$

CPU elapsed time, cput, consists of both the elapsed time for the CPU component and elapsed time for page faults.

I/O Elapsed Time $$sit(s,k)=FF(s)*s+FF(k)*k$$

I/O elapsed time, sit(s,k), consists of both the elapsed time for seeks and elapsed time for Kilobyte transfers.

Message Elapsed Time $$mt(m,mkb)=FF(m)*m+FF(mkb)*mkb$$

Message elapsed time, mt(m,mbk), consists of the elapsed time for messages, taking into consideration the number of messages and the number of kilobytes transferred for all messages.

Elapsed Time for a Vector

Given a vector, the following formula yields the elapsed time for the execution of the associated operator:

$$\text{elapsedTime}=\max(sit(s,k), mt(m,mkb), cput)+blk\_idlt.$$

This formula relies on the assumption that, for a given resource vector, I/O, messaging and CPU can overlap. Therefore, the formula takes the maximum of their associated elapsed times and adds that value to the blocking/idle time.

Total Resource Usage

Given a resource vector and a performance goal of optimizing for minimal resource usage, the total resource usage may be calculated as a weighted sum of each component in the resource vector. A database administrator may provide these weights through a user interface.

Cost Object

A cost object consists of the four SimpleCostVector objects set forth below. In this context, "current process," as used in connection with the second, third and fourth objects listed below, refers to the operator whose cost is being considered.

1) Total Cost (TC)

This vector represents the resource usage necessary for the associated operator in the expression tree to execute in its entirety. Query parallelism typically has no effect on TC. For repeat counts greater than one, this vector represents cumulative usage for all probes.

2) Current Process First Row (CPFR)

This vector represents resource usage necessary for the associated operator in the expression tree to produce its first row after any blocking activity has occurred. For repeat counts greater than one, this vector represents the resource usage necessary to produce the first row in an average probe, not the first row of the first probe.

3) Current Process Last Row (CPLR)

This vector represents resource usage necessary for the associated operator in the expression tree to produce its last row after any blocking activity has occurred. Thus, for repeat counts greater than one, this vector represents cumulative usage for all probes.

4) Current Process Total Blocking (CPTB)

If an operator must wait for one or more of its descendants to fully complete before it can produce its first row, it is called a "blocking" operator. Examples of blocking operators include sort and hash-group-by operators. Typically, a blocking operator consists of a blocking phase when it builds some data structure (e.g. a sorted temporary file in the case of sort, a hash table in the case of hash-group-by, etc.) and an output phase in which it uses the data structure from the blocking phase to produce its output rows. CPTB represents resources used by a blocking operator and its descendants during the blocking operator's blocking phase. CPTB will equal the zero vector for non-blocking operators having no blocking descendants. For repeat counts greater than one, CPTB represents the average usage per probe.

Computing Elapsed Times for Cost Objects

Given a Cost object and a performance goal specifying either first row or last row optimization, a presently preferred embodiment of the present invention computes the elapsed time for the Cost object in question, as follows:

Elapsed Time for a First Row Performance Goal

The following formula may be used to calculate the elapsed time for a plan to produce the first row:

$$elapsedTime=ET(CPFR)+ET(CPTB)$$

In this formula, ET(CPTB) and ET(CPFR) represent the elapsed times of the CPTB vector and the CPFR vector respectively for the Cost object in question. The formula takes into account the elapsed time to produce the first row plus the elapsed time of any preceding blocking activity.

Elapsed Time for a Last Row Performance Goal

The following formula may be used to calculate the elapsed time for a plan to produce the last row:

$$elapsedTime=ET(CPLR)+ET(CPTB)*RC(CPTB)$$

In this formula, ET(CPTB) and ET(CPLR) represent the elapsed times of the CPTB vector and the CPLR vector respectively for the Cost object in question. RC(CPTB) represents the repeat count for the CPTB vector. The term ET(CPTB)*RC(CPTB) represents the cumulative blocking time of all probes. This formula takes into account the elapsed time to produce the last row of the last probe, plus the elapsed time of any blocking activity over all probes.

Minimal Resource Performance Goal

When optimizing for a performance goal of minimal resource usage, the optimizer does not calculate an elapsed time, but instead calculates a weighted sum of each component in the TC vector. In a presently preferred embodiment, a database administrator may assign the relative weights to each component of the TC vector. If the administrator wants to limit the usage of a particular resource, the administrator can assign a greater relative weight to the component of the TC vector that reflects the usage of that resource.

Algebra for SimpleCostVector Objects

In order to roll up Cost objects associated with physical operators in a query tree, the following algebra is used for SimpleCostVector objects.

Zero Vectors

A vector with zeros in all components (except repeat count) is called a zero vector and is represented as "Z." A vector having a non-zero Blocking/Idle time component of x and zeros in all other components (except repeat count) is called a blocking/idle vector. It is represented as I(x).

Vector Arithmetic

SimpleCostVector objects can be added and subtracted. SimpleCostVectors can be multiplied and divided by scalars. These operations are denoted as $+^V$, $-^V$, $*^V$ and $/^V$ respectively. Vector addition ($+^V$) involves adding the corresponding components (except repeat count) of two vectors, as in traditional linear algebra. The repeat count component of the result vector retains the repeat count of the first vector specified. (When adding average resource usage vectors, i.e. CPTB, the repeat counts for both vectors should be the same. Similarly, vector subtraction ($-^V$) involves subtracting the corresponding components (except repeat count) of two vectors. Since the present invention does not allow negative resource usage, any resulting negative component is converted to zero. The repeat count component of the result vector retains the repeat count of the first vector specified.

Multiplying a SimpleCostVector object by a scalar involves multiplying each component, except Normal Memory, Persistent Memory and repeat count, by the specified scalar. Normal Memory and Persistent Memory remain unchanged because memory is reused. Thus, the number of times an operator executes does not affect its memory consumption. Similarly, dividing a SimpleCostVectorobject by a scalar involves dividing each component (except Normal Memory, Persistent Memory and repeat count) by the specified scalar.

The present invention involves two additional forms of vector addition: overlapped vector addition (denoted $+^O$), and blocking vector addition (denoted $+^B$). Overlapped vector addition takes into account that in some cases I/O and messaging partially overlap, i.e., they can occur at the same time. Thus, the CPU, Normal Memory, Persistent Memory and Temporary Disk Space components get added together according to the vector addition described above, but the I/O and message related components use the following formulas for overlapped addition:

$$s_{result}=MAX(s_{v1}, s_{v2})+FF(io)*MIN(s_{v1}, s_{v2})$$

$$k_{result}=MAX(k_{v1}, k_{v2})+FF(io)*MIN(k_{v1}, k_{v2})$$

$$m_{result}=MAX(m_{v1}, m_{v2})+FF(msg)*MIN(m_{v1}, m_{v2})$$

$$mkb_{result}=MAX(mkb_{v1}, mkb_{v2})+FF(msg)*MIN(mkb_{v1}, mkb_{v2})$$

In the formulas above, the "result" subscript refers to components in the resulting vector, and the subscripts "v1" and "v2" refer to components of the two vectors being added with overlapped addition.

The same basic formula applies to each component, so a single explanation will suffice. If the two vectors pertain to completely overlapped activity, then the larger of the two components will become the resulting component, hence the term $MAX(s_{v1}, s_{v2})$. Typically, however, the overlap will not be complete. The extent to which the overlap occurs is inversely proportional to the size of the smaller component. Hence, the term $FF(x)*MIN(s_{v1}, s_{v2})$. Thus, $FF(x)=0$ results in complete overlap while $FF(x)=1$ results in no overlap at all.

Overlapped addition for the Blocking/Idle time component requires a more sophisticated formula; two Blocking/Idle time components cannot simply be added together. Consider two vectors v1 and v2 each potentially having a non-zero Blocking/Idle time component. The time the operator associated with v1 is active effectively reduces the Blocking/Idle time of v2 and vice versa. Only after Blocking/Idle time components of both v1 and v2 have been reduced by the elapsed time of the other vector (but not below zero) can we add the two components together. To determine the elapsed time of a vector, we use the formula presented above. Here is the formula for adding Blocking/Idle time components:

$$blk\_idlt_{result}=MAX(0, blk\_idle_{v1}-(ET(v2)-blk\_idle_{v2}))+MAX(0, blk\_idle_{v2}-(ET(v1)-blk\_idle_{v1}))$$

where $ET(v)$ represents the elapsed time of vector v.

The term $(ET(v2)-blk\_idle_{v2})$ is the amount of time the operator associated with vector v2 was active. The term $blk\_idle_{v1}-(ET(v2)-blk\_idle_{v2})$ represents the amount of time the operator associated with vector v1 was idle less the amount of time the operator associated with vector v2 was active. The MAX functions in this case merely ensure a non-negative result.

Consider the following simplified example. Assume v1 has an elapsed time 20 of which 8 is idle. Assume also that vector v2 has an elapsed time of 15 of which 10 is idle time. The resulting idle time of $v1+^O v2$ is $$MAX(0,8-(15-10))+MAX(0,10-(20-8))=MAX(0,3)+MAX(0,-2)=3+0=3.$$

Repeated overlapped addition involves adding a vector to itself a repeated number of times using overlapped addition. We denote this with the symbol $*^O$. For example, given vector v and scalar c, the term $c *^O v$ represents vector v added to itself c times using overlapped addition. Normal memory, persistent memory and repeat count remain unchanged.

Blocking Vector Addition

Consider two vectors v1 and v2 in which v2 pertains to a blocking operator[3]. Since v2 is blocking, the following formula must hold:

[3] A blocking operator (e.g., sort) can not return a row to its parent until it has received all rows from one or more of its children. The hash join can not return a row to its parent until it has received all rows from its right child, so strictly speaking only its first phase is blocking.

$$ET(v1)+ET(v2)=ET(v1+v2).$$

However, neither traditional vector addition nor overlapped vector addition has this property. Therefore, the present invention defines blocking vector addition, $+^B$, which has the appropriate characteristic:

$$v1+^B v2=v1+^V v2+^V I(ET(v1)+ET(v2)-ET(v1+^V v2)).$$

Recall that $I(x)$ represents a vector having a Blocking/Idle time component of x and zeros in all other components (except repeat count).

Table 1 below illustrates blocking vector addition. To simplify the presentation, assume that each vector has only 3 components—CPU, I/O and Blocking/Idle time—and that elapsed time is MAX(CPU, I/O)+Blocking/Idle time. In other words, for a given operator, its CPU and I/O overlap.

TABLE 1

| Vector | CPU | I/O | Blocking/Idle | Elapsed Time |
|---|---|---|---|---|
| v1 | 10 | 5 | 1 | 11 |
| v2 (blocking) | 2 | 15 | 2 | 17 |
| v1 +$^V$ v2 | 12 | 20 | 3 | 23 |
| I( ET(v1) + ET(v2) − ET(v1 +$^V$ v2)) | 0 | 0 | 5 | 5 |
| v1 +$^B$ v2 | 12 | 20 | 8 | 28 |

Vector v1 has a CPU of 10 and an I/O of 5 and a Blocking/Idle time of 1, so its elapsed time is 11 (Blocking/Idle time plus the maximum of CPU and I/O). Vector v2 has a CPU of 2 and an I/O of 15 and a Blocking/Idle time of 2, so its elapsed time is 17 (Blocking/Idle time plus the maximum of CPU and I/O). Adding v1 and v2 using vector addition involves adding each respective component resulting in a CPU of 12, an I/O of 20 and a Blocking/Idle time of 3. Thus, the elapsed time of this resulting vector is 23 (Blocking/Idle time plus the maximum of CPU and I/O).

Notice that the elapsed times for v1 and v2 do not add up to the elapsed time of $v1+^V v2$. This comes about because, with normal vector addition, we implicitly overlap v1's I/O with v2's CPU and vice versa, but this is inappropriate since v2 represents resources used by a blocking operator.

Blocking vector addition accurately takes into account disallowing overlap. First a vector having a Blocking/Idle time of $ET(v1)+ET(v2)-ET(v1+^V v2)=11+17-23=5$ is created. All other components (except repeat count) have a value of zero.

Finally, we calculate the blocking sum, $v1+^B v2=v1+^V v2+^V I(ET(v1)+ET(v2)-ET(v1+^V v2))$, where $ET(v1)+ET(v2)=ET(v1+^B v2)=28$.

Vector Comparison Functions

The function etMIN takes two vectors and returns the one having minimum elapsed time; etMAX takes two vectors and returns the one having maximum elapsed time. The function vecMIN takes two vectors and produces a resulting vector that represents minimum resource usage from the two input vectors. Similarly, vecMAX takes two vectors and produces a resulting vector that represents maximum resource usage from the two input vectors.

Table 2 below explains how vecMIN and vecMAX produce each component in the resulting vector, respectively.

TABLE 2

| Component | vecMin (vecMax) result |
|---|---|
| CPU | From input vector with minimum (maximum) CPU elapsed time |
| Seeks | From input vector with minimum (maximum) I/O elapsed time |
| I/O Transfer | From input vector with minimum (maximum) I/O elapsed time |
| Messages | From input vector with minimum (maximum) message elapsed time |
| Message Transfer | From input vector with minimum (maximum) message elapsed time |
| Repeat Count | From first specified input vector in all cases |
| All other components | From input vector with minimum (maximum) component value |

Vector Normalization

The repeat count (also called number of probes) indicates the number of times an operator associated with a particular vector will execute. Typically an operator executes only once, but in some cases (e.g. the inner scan of a nested loops join) an operator can execute multiple times. Given a vector v, the abbreviation RC(v) represents its repeat count.

Recall that for a Cost object, the vector CPTB represents average resource usage per probe rather than cumulative resource usage. Whenever such "average usage per probe" vectors are added together, both vectors should pertain to the same number of probes (i.e. have the same repeat count). "Vector normalization" refers to the conversion of a vector from one repeat count to another. Given a vector v and a target repeat count rc, the abbreviation N(v,rc) is used to represent normalizing v to a repeat count rc. When normalizing a vector v to a repeat count rc, its Normal Memory and Persistent Memory components remain unchanged since an operator's memory consumption does not change when it executes repeatedly. The repeat count of the normalized vector becomes rc by definition of normalization. All other components are calculated with the following formula:

$$C_{N(v,rc)} = C_v * RC(v)/rc$$

where $C_v$ represents a component in vector v and $C_{N(v,rc)}$ represents the corresponding component in the normalized vector.

The term $C_v*RC(v)$ represents the cumulative amount of component $C_v$ over all probes. Dividing the result by rc makes it an average amount over rc number of probes. Table 3 below summarizes the vector algebra abbreviations used throughout this patent:

TABLE 3

| Vector Abbreviation | Explanation |
| --- | --- |
| $+^V, -^V, *^V, /^V$ | traditional vector operations |
| $+^O$ | overlapped vector addition |
| $*^O$ | repeated overlapped vector addition |
| $+^B$ | blocking vector addition |
| N(v,rc) | vector v normalized to repeat count of rc |
| Z | zero vector |
| I(x) | vector with idle component x and zeros in all other components |
| RC(v) | repeat count of vector v |
| ET(v) | elapsed time of vector v |
| vecMIN(v$_1$,v$_2$) | vector of minimum resource usage from two input vectors v$_1$ and v$_2$ |
| vecMAX(v$_1$,v$_2$) | vector of maximum resource usage from two input vectors v$_1$ and v$_2$ |
| etMIN(v$_1$,v$_2$) | vector with minimum elapsed time from vectors v$_1$ and v$_2$ |
| etMAX(v$_1$,v$_2$) | vector with maximum elapsed time from vectors v$_1$ and v$_2$ |

Rolling Up Cost Objects

Figure 3:
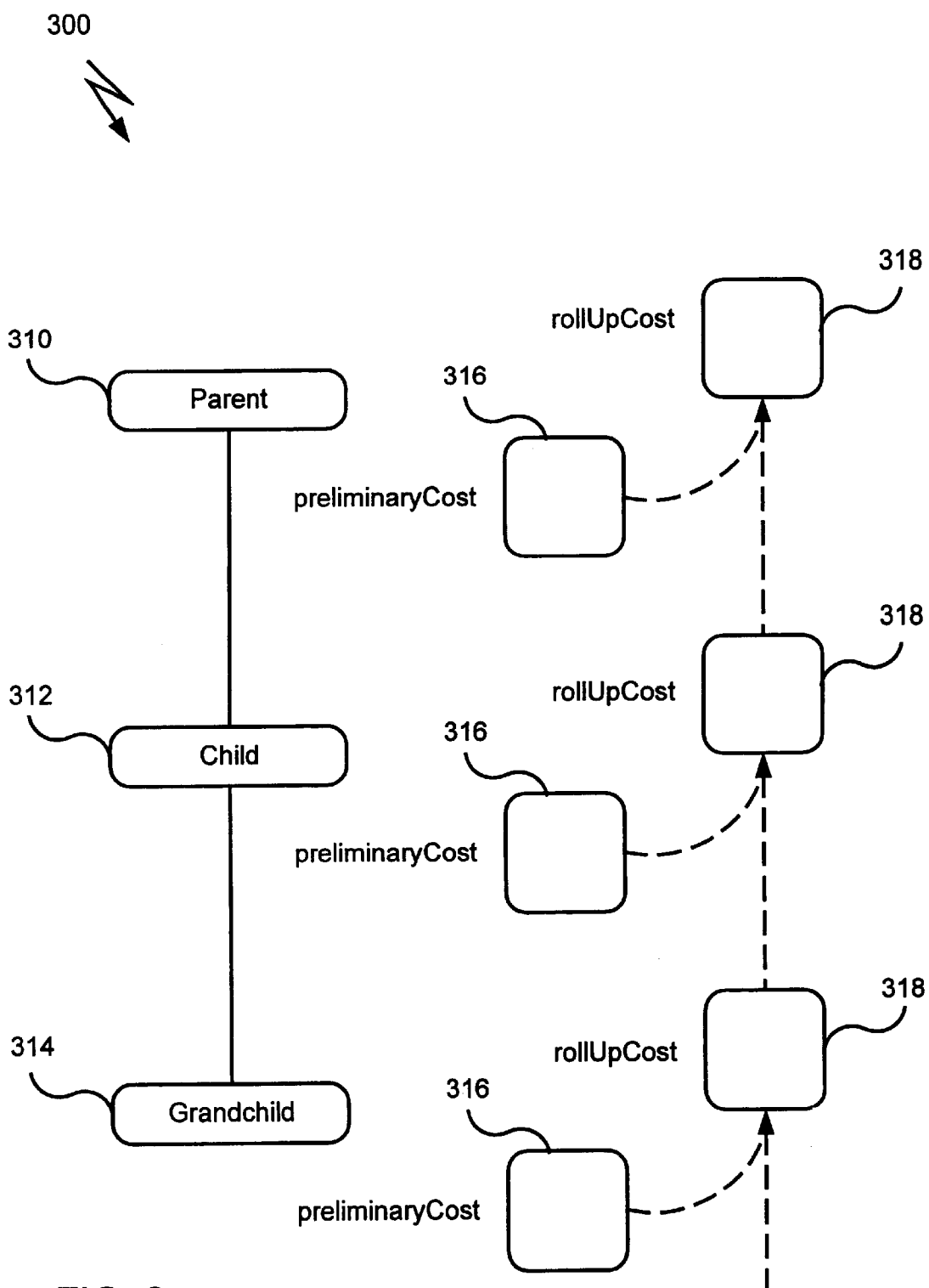
FIG. 3 is an illustration of a generalized cost roll-up from grandchild to child to parent operator.

FIG. 3 illustrates a generalized cost roll-up procedure 300. Each operator 310, 312, 314, in the query tree keeps cost information (i.e. a Cost object) about itself independent of its children, called its preliminaryCost 316. Each operator also keeps track of the cost information it reported up to its parent, called rollUpCost 318. For leaf nodes in a query tree, preliminaryCost=rollUpCost. From the perspective of a given operator in a query tree, rolling up a cost vector involves combining a rollUpCost received from the operator's child with the operator's own preliminaryCost to produce its own rollUpCost which the operator will in turn report up to its parent. The parent operator will in turn combine its preliminaryCost with the rollUpCost it receives to produce a rollUpCost for its parent. The roll up proceeds recursively up the query tree in this manner until it reaches the root node in the query tree. Thus, a given operator's rollUpCost reflects the cost of the entire subtree rooted at that operator.

FIG. 3 shows a parent operator 310 having only a single child 312. The child 312, in turn, has only a single grandchild 314. When an operator has multiple children (e.g., join or union), the present process first combines all child roll-up costs into a single merged roll-up cost and then uses that merged cost with the unary roll-up scheme depicted in FIG. 3.

Figure 4:
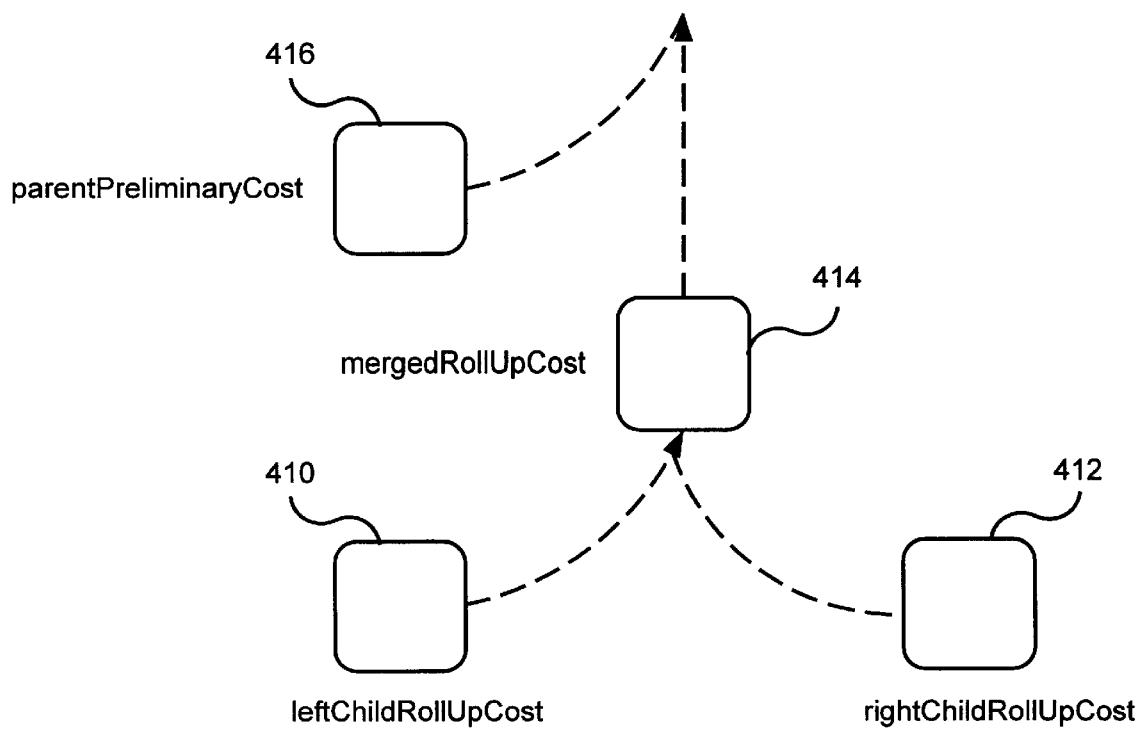
FIG. 4 is an illustration of the merging of child costs and the roll-up of the merged costs with the parent's costs.

FIG. 4 illustrates the merging of child costs 410, 412 and rolling up the merged cost 414 with the parent's preliminary cost 416. As explained below, the particular details of child cost merging and cost roll-up depend on the characteristics of the operators involved. Table 4 below lists the cost object abbreviations used throughout this document:

TABLE 4

| Cost Abbreviation | Explanation |
| --- | --- |
| PP | parent preliminary cost |
| PR | parent roll-up cost |
| CR | child roll-up cost |
| L | left child roll-up cost |
| R | right child roll-up cost |
| M | merged children roll-up cost |
| N | non-blocking cost |
| C | non-blocking cost converted to blocking |

Non-blocking Unary Roll-up

Figure 5:
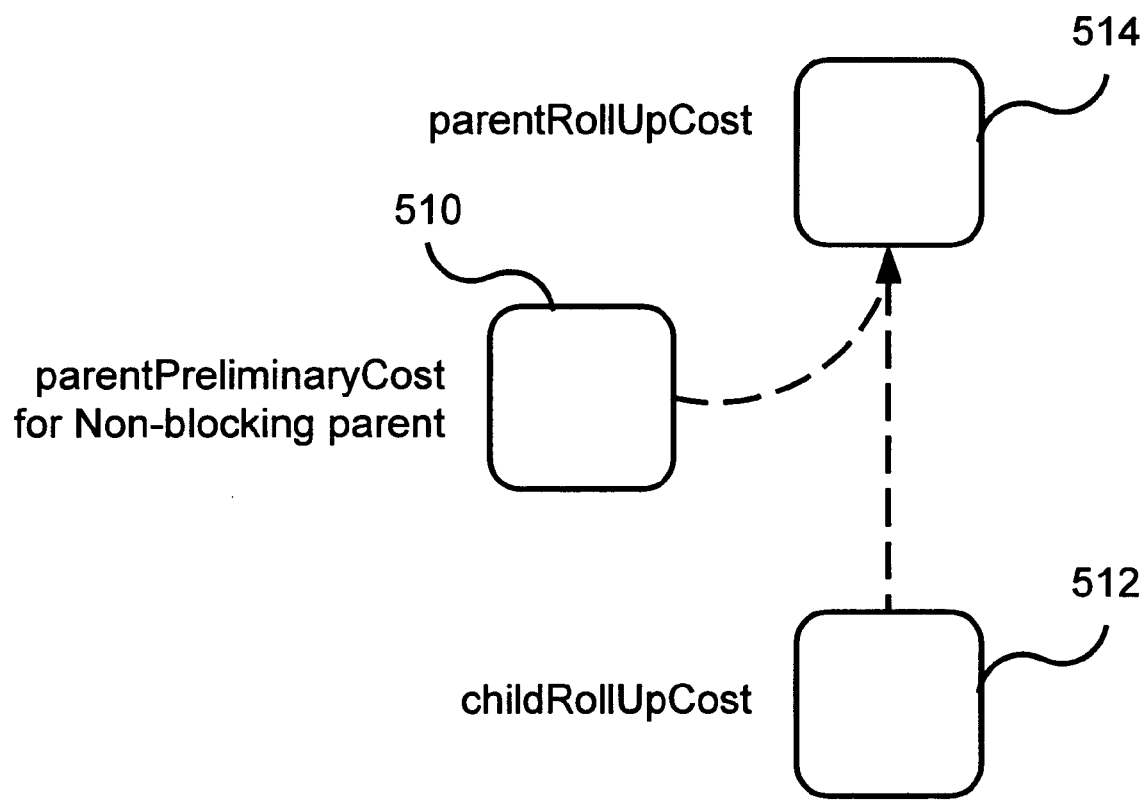
FIG. 5 is an illustration of a unary roll-up involving a non-blocking parent.

FIG. 5 depicts a unary roll-up involving a non-blocking parent having a preliminaryCost 510 and receiving a roll-up cost 512 from its descendent operators. The preliminaryCost 510 and the child rollUpCost 512 are combined to yield a parent rollUpCost 514. The roll-up formulas for this case are, as follows:

$$TC_{PR} = TC_{PP} +^V TC_{CR}$$

$$CPFR_{PR} = CPFR_{PP} +^B CPFR_{CR}$$

$$CPLR_{PR} = (CPLR_{PP} +^O (CPLR_{CR} -^V CPFR_{CR})) +^V CPFR_{CR}$$

$$CPTB_{PR} = N(CPTB_{CR}, RC(CPLR_{PP}))$$

Since TC represents an accumulation of all resources, we use vector addition. However, the formula for CPFR involves adding the parent's preliminary cost with the child's roll-up cost. Blocking addition is used because a parent can not produce its first row until it receives at least one row from its child.

The formula for CPLR is more involved. The term $(CPLR_{CR} -^V CPFR_{CR})$ represents the child's cumulative cost except for its first row. The work associated with this term overlaps with the parent's activity, so it is added to the parent's preliminary cost using overlapped addition, hence the term $(CPLR_{PP} +^O (CPLR_{CR} -^V CPFR_{CR}))$. Finally $CPFR_{CR}$ is added using vector addition since the activity for the child to produce its first row does not overlap with the parent.

Since the parent does not block, the parent simply reports the blocking activity reported up from its child. Thus, we normalize the blocking vector (CPTB) to the parent's repeat count but otherwise leave CPTB unchanged.

Blocking Unary Roll-up

Figure 6:
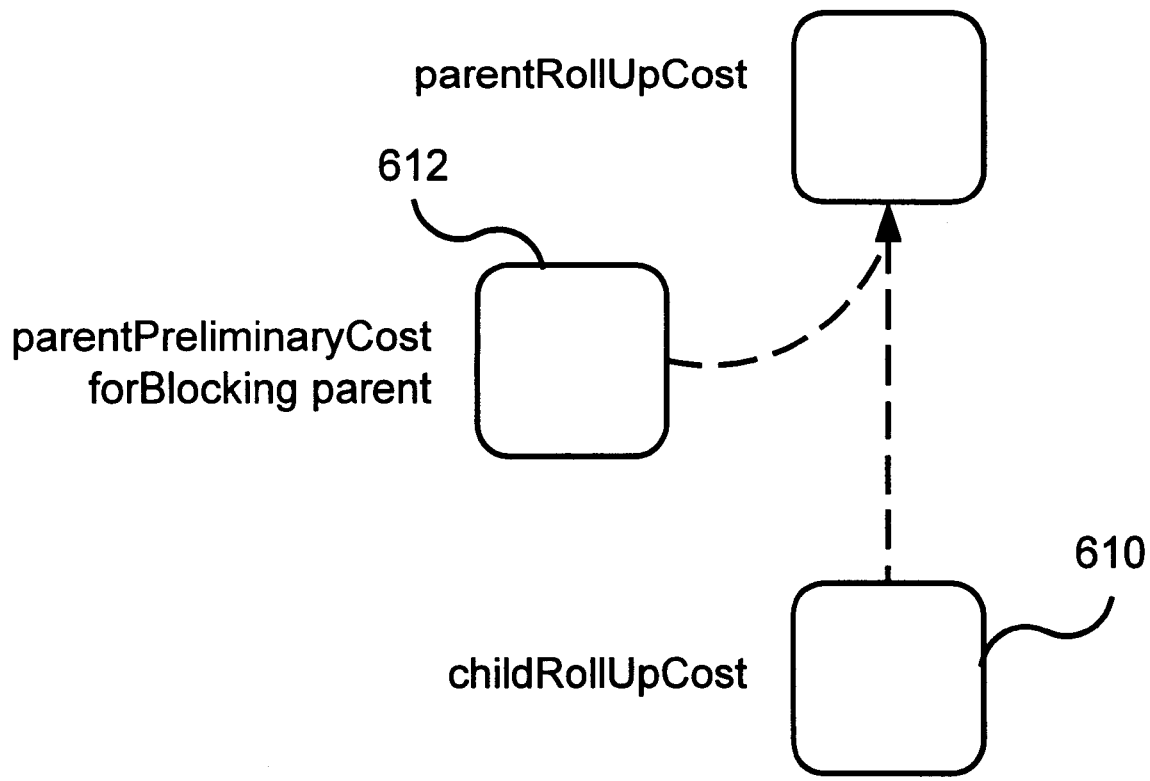
FIG. 6 is an illustration of a unary roll-up involving a blocking parent.

FIG. 6 depicts a unary roll-up involving a blocking parent. As illustrated in this figure, the child rollUpCost 610 is combined with the blocking parent's preliminaryCost 612 to yield the parent rollUpCost. The roll-up formulas for this case are:

$$TC_{PR} = TC_{PP} +^V TC_{CR}$$

$$CPFR_{PR} = CPFR_{PP}$$

$CPLR_{PR} = CPLR_{PP}$ $CPTB_{PR} = (CPTB_{PP} +^O (CPLR_{CR}/^V RC(CPTB_{PP}))) +^B N(CPTB_{CR}, RC-(CPTB_{PP}))$

The formula for $TC_{PR}$ uses vector addition to accumulate all resource usage.

For a blocking operator, $CPFR_{PP}$ represents the cost of generating the first row once the blocking activity has completed. (For example, in the case of a sort, $CPFR_{PP}$ represents the cost to read the first row from the sorted result set and send it to the parent.) $CPLR_{PP}$ for a blocking operator represents the cost of generating the last row once the blocking activity has completed. (For example, in the case of a sort, $CPLR_{PP}$ represents the cost to read all rows from the sorted result set and send them to the parent.) $CPTB_{PP}$ represents the cost of the actual blocking activity (e.g. in the case of a sort, the cost of producing the sorted result set).

With a blocking parent operator, the last row and first row costs rolled up from the child reflect blocking activity since they took place during the parent operator's blocking phase, so they are combined with the parent's blocking cost. Thus, for its first and last row costs, the parent rolls up only its preliminary costs: $CPFR_{PP}$ and $CPLR_{PP}$.

When calculating the cost roll-up for total blocking, the child's blocking and last row costs are added to the parent's blocking cost, since all of the child's activity took place during the parent's blocking phase. The term $(CPLR_{CR}/^V RC(CPTB_{PP}))$ converts the child's rolled up last row cost to an average cost per probe to make the addition with the parent's blocking vector meaningful. The term $(CPTB_{PP} +^O (CPLR_{CR}/^V RC(CPTB_{CR})))$ involves adding parent's blocking activity with the child's non-blocking activity, hence the overlapped addition. The term normalize($CPTB_{CR}$, $RC(CPTB_{PP})$) represents the child's blocking activity (normalized to the parent's repeat count), so we add it in using blocking addition.

Union Operator

Since a union operator has two children, the roll-up costs for each child are merged into a single roll-up cost before using the unary roll-up formulas described earlier.

Two Non-blocking Legs

The formulas below indicate how a union operator's left and right children can be merged when neither leg has any blocking operators:

$TC_M = TC_L +^V TC_R$ $CPFR_M = et\text{MIN}(CPFR_L, CPFR_R) +^O vec\text{MIN}(CPFR_L, CPFR_R)$ $CPLR_M = CPLR_L +^O CPLR_R$ The formula for $TC_M$, as for all total cost computations, involves normal vector addition.

To determine $CPFR_M$, we need to recognize that the first row produced by either of the two legs becomes the first row produced by the union operator itself, hence the term etMIN($CPFR_L$, $CPFR_R$). Unfortunately, the two legs do not act in isolation; they interfere with one another at least to some degree. The term vecMIN($CPFR_L$, $CPFR_R$) measures this interference. Consider any component of a vector, say CPU. If the left child uses 100 units of CPU to produce its first row and the right child used 75 units of CPU to produce its first row, then CPU interference only occurs during the first 75 units.

Overlapped addition is used when computing $CPFR_M$ because the left and right child of a union act independently (logically speaking), so when one has issued an I/O, the other can utilize the CPU or send a message.

To determine $CPLR_M$ we need to recognize that both its children must complete before a union operator can produce its last row. Since the left and right child of a union act independently, we simply use an overlapped add.

Two Blocking Legs

The formulas below indicate how to merge a union operator's left and right children when both legs have blocking operators:

$TC_M = TC_L +^V TC_R$ $CPFR_M = et\text{MIN}(CPFR_L, CPFR_R) +^O vec\text{MIN}(CPFR_L, CPFR_R)$ if $(ET(CPTB_L) < ET(N(CPTB_R, RC(CPTB_L))))$ $CPLR_M = CPLR_L +^O (CPLR_R +^V (RC(CPTB_R) *^O (CPTB_R -^V vec\text{MIN}(CPTB_R, N(CPTB_L, RC(CPTB_R))))))$ else $CPLR_M = CPLR_R +^O (CPLR_L +^V (RC(CPTB_L) *^O (CPTB_L -^V vec\text{MIN}(CPTB_L, N(CPTB_R, RC(CPTB_L))))))$ end $CPTB_M = et\text{MIN}(CPTB_L, N(CPTB_R, RC(CPTB_L))) +^O vec\text{MIN}(CPTB_L, N(CPTB_R, RC(CPTB_L)))$ The formula for $TC_M$, as a total cost computation, involves regular vector addition.

The formula for $CPFR_M$ remains unchanged from the previous case of two non-blocking legs.

The formula for $CPTB_M$ resembles that of $CPFR_M$ with the added complication of normalizing the right leg's blocking vectors to the repeat count of the left leg. (Remember, blocking vectors represent average usage per probe, so they need to be normalized to the appropriate repeat count before proceeding.) Since a simple union can begin processing rows as soon as one of its blocking legs has begun sending rows, we make the merged blocking vector the child blocking vector with minimum elapsed time adjusted upwards to account for interference between the two blocking legs. (An alternative formula, $CPTB_L +^O CPTB_R$, involves an implicit assumption that no activity can begin until both blocking children have completed their work. Since, typically, a union operator does not wait until both blocking children have completed their work, this alternative formula is usually too conservative and provides a worst case cost.)

There is a very complicated formula for $CPLR_M$. First, ET($CPTB_L$) and ET(N($CPTB_R$, RC($CPTB_L$))) are compared to determine which leg had the slowest total blocking vector. (Again, the right leg's blocking vector is normalized to the left leg's repeat count since blocking vectors represent average usage per probe.) Assuming a faster left leg, the term $CPTB_R -^V vec\text{MIN}(CPTB_R, N(CPTB_L, RC(CPTB_R)))$ is a good estimate of the amount of $CPTB_R$ not reflected in $CPTB_M$. If we encounter a faster right leg, then the term $CPTB_L -^V vec\text{MIN}(CPTB_L, N(CPTB_R, RC(CPTB_L)))$ represents the amount of $CPTB_L$ not reflected in $CPTB_M$. The appropriate result vector is then added to $CPLR_M$ and thus, in the final costing, we avoid losing the resource usage that the result vector represents.

Finally, recall that CPTB reflects an average usage per probe, whereas CPLR reflects cumulative usage. The term $RC(CPTB_R) *^O (CPTB_R -^V vec\text{MIN}(CPTB_L, N(CPTB_R, RC(CPTB_L))))$ (or $RC(CPTB_L) *^O (CPTB_L -^V vec\text{MIN}(CPTB_L, N(CPTB_R, RC(CPTB_L))))$ if we encounter a slower left leg) converts average usage to cumulative usage. Overlapped multiplication is used since successive probes can overlap with each other.

One Blocking Leg and One Non-blocking Leg

In the case of a union with exactly one blocking leg, the non-blocking child's cost is converted to look like a set of blocking vectors and then the two children are combined using the formulas for both legs blocking described earlier. The transformation of a non-blocking leg into a blocking leg uses the following formulas:

$$TC_C = TC_N$$

$$CPFR_C = Z$$

$$CPLR_C = CPLR_N -^V CPFR_N$$

$$CPTB_C = CPFR_N$$

These formulas simply move CPFR into the blocking vector. Since last row elapsed time combines CPTB and CPLR, CPFR is subtracted from CPLR. This reflects the fact that waiting for a first row from a child operator is a form of blocking.

Merge Join Operator

Since a merge join (MJ) operator has two children, there is a need to merge the roll-up costs for each child into a single roll-up cost before using the unary roll-up formulas described earlier.

Two Non-blocking Legs

The formulas below indicate how to combine an MJ operator's left and right children when neither leg has any blocking operators:

$$TC_M = TC_L +^V TC_R$$

$$CPFR_M = CPFR_L +^O CPFR_R$$

$$CPLR_M = CPLR_L +^O CPLR_R$$

The formula for $TC_M$, as a total cost computation, involves regular vector addition.

Since both its legs must produce their respective first rows before an MJ operator can produce its first row, $CPFR_M$ is simply the overlapped add of CPFR for both legs.

The computation for $CPLR_M$ is the same as for the Union operator.

Two Blocking Legs

The formulas below indicate how to combine an MJ operator's left and right children when both children have blocking operators:

$$TC_M = TC_L +^V TC_R$$

$$CPFR_M = CPFR_L +^O CPFR_R$$

if $(ET(CPTB_L) < ET(N(CPTB_R, RC(CPTB_L))))$ $$CPLR_M = CPLR_L +^O (CPLR_R +^V (RC(CPTB_R) *^O (CPTB_R -^V vec\text{-}MIN(CPTB_L, CPTB_R))))$$

else $$CPLR_M = CPLR_R +^O (CPLR_L +^V (RC(CPTB_L) *^O (CPTB_L -^V vec\text{-}MIN(CPTB_L, CPTB_R))))$$

end $$CPTB_M = (et\text{MIN}(CPTB_L, N(CPTB_R RC(CPTB_L))) +^O vec\text{MIN}(CPTB_L, N(CPTB_R, RC(CPTB_L)))$$

The formula for $TC_M$, as a total cost computation, involves regular vector addition.

Since an MJ requires rows from both its children before it can produce a row itself, $CPFR_M$ is simply the overlapped sum of CPFR for each of its children. We use overlapped addition on the assumption that when one child has issued an I/O the other can send messages or utilize CPU.

Both a union operator and an MJ operator must receive their slower child's last row before they can produce their own last row. Thus, the union operator's formulas for $CPLR_M$ and $CPTB_M$ also apply to an MJ operator.

One Blocking Leg and One Non-blocking Leg

When exactly one of an MJ operator's children has a blocking leg, the MJ operator combines the two legs using the same strategy as the union operator: i.e. converting the non-blocking leg to a blocking leg (using the exact same transformation rules as the union operator) and then proceeding as if it had two blocking legs using the formulas described above.

Nested Loops Join Operator

Figure 7:
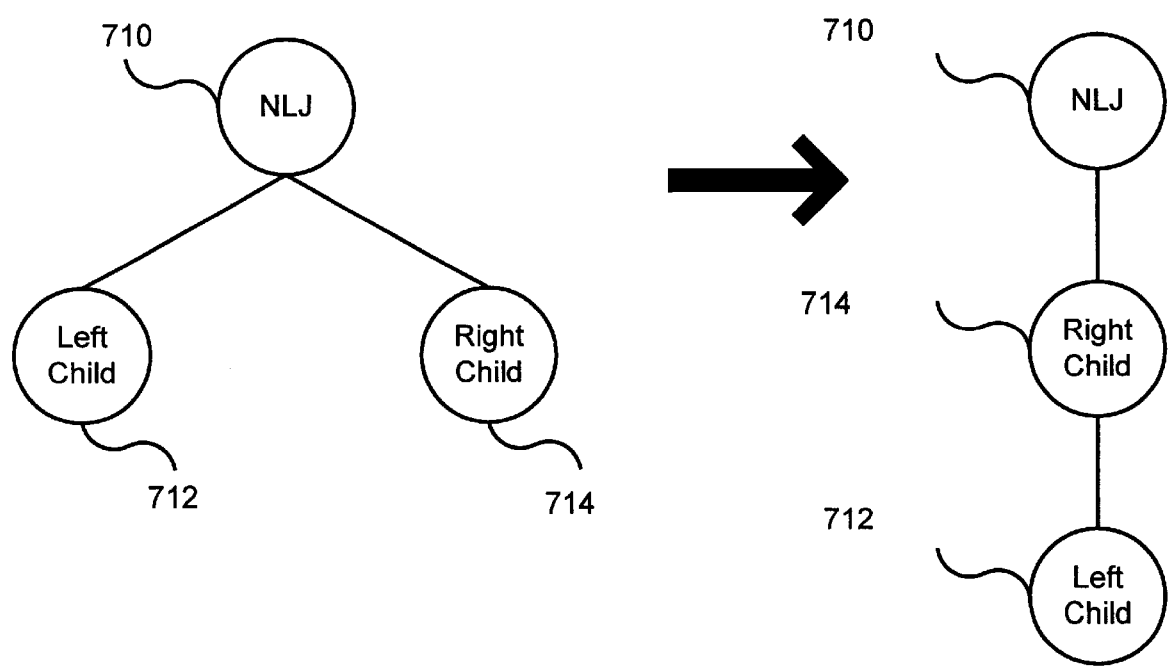
FIG. 7 is an illustration of a transformation in which, in a Nested Loops Join ("NLJ"), the left child is treated as a unary child of the NLJ operator's right child.

As illustrated in FIG. 7, since a nested loops join (NLJ) operator 710 has two children 712, 714, the roll-up costs for each child 712, 714 are merged into a single roll-up cost before using the unary roll-up formulas described earlier.

All output rows from an NLJ operator's left child 712 eventually get sent to the right child 714, so the NLJ operator's left child 712 can be viewed as providing rows directly to the right child 714. Thus, for purposes of merging the children, one can treat the left child 712 as a unary child of the NLJ operator's right child 714. By making this transformation, one can use the unary roll-up formulas to merge the two legs.

Both Legs Non-blocking

The formulas below indicate how to merge an NLJ operator's left and right child when neither leg has any blocking operators:

$$TC_M = TC_L +^V TC_R$$

$$CPFR_M CPFR_L +^B CPFR_R$$

$$CPLR_M = (CPLR_R +^O (CPLR_L -^V CPFR_L)) +^V CPFR_L$$

The formulas for $TC_M$, $CPFR_M$ and $CPLR_M$ come directly from the unary non-blocking roll-up formulas. By assumption, neither leg blocks, so $CPTB_M$ is a zero vector.

The formula for $CPFR_M$ relies on the assumption that the first probe in the right child produces the actual first row. When the first row requires multiple probes, all probes after the first probe may overlap with the previous probe, which suggests using overlapped addition ($CPFR_L +^O CPFR_R$) instead of blocking addition. One could also choose to use regular vector addition ($CPFR_L +^V CPFR_R$) as a compromise. In the majority of cases, however, the first probe will result in the first row. Therefore, in the presently preferred embodiment, use of the blocking version of the formula is preferred.

Left Leg Blocking, Right Leg Non-blocking

The formulas below indicate how to merge an NLJ operator's left and right child when only the left leg has at least one blocking operator:

$$TC_M = TC_L +^V TC_R$$

$$CPFR_M = CPFR_L +^B CPFR_R$$

$$CPLR_M = (CPLR_R +^O (CPLR_L -^V CPFR_L)) +^V CPFR_L$$

$$CPTB_M = N(CPTB_L, RC(CPLR_R))$$

The formulas for $TC_M$, $CPFR_M$ and $CPLR_M$ come directly from the unary non-blocking roll-up formulas.

The left leg may be viewed as logically coming underneath the right leg, and by assumption only the left leg blocks, so $CPTB_L$ becomes $CPTB_M$ after normalizing $CPTB_L$ to the right leg's repeat count.

Left Leg Non-Blocking, Right Leg Blocking

The formulas below indicate how to merge an NLJ operator's left and right children when only the right leg has at least one blocking operator:

$$TC_M = TC_L +{}^V TC_R$$

$$CPFR_M = CPFR_R$$

$$CPLR_M = CPLR_R$$

$$CPTB_M = CPTB_R + {}^O(CPLR_L/{}^V RC(CPTB_R))$$

The formulas for $TC_M$, $CPFR_M$ and $CPLR_M$ come directly from the unary blocking roll-up formulas.

The formula for $CPTB_M$ is a simplification of the unary blocking roll-up formula taking into account that the left leg has no blocking activity.

Both Legs Blocking

The formulas below indicate how to merge an NLJ operator's left and right children when both legs have at least one blocking operator:

$$TC_M = TC_L + {}^V TC_R$$

$$CPFR_M = CPFR_R$$

$$CPLR_M = CPLR_R$$

$$CPTB_M = (CPTB_R + {}^O(CPLR_L /{}^V RC(CPTB_R))) + {}^B N(CPTB_L, RC(CPTB_R))$$

The formulas for $TC_M$, $CPFR_M$, $CPLR_M$, and $CPTB_M$ all come directly from the unary blocking roll-up formulas.

Hash Join Operator

Unlike binary operators described earlier, the hash join (HJ) operator does not merge the roll-up costs of its two children and then use a unary roll-up formula to produce its own roll-up cost. Instead, it uses intermediate cost vectors and values calculated and saved off during preliminary costing and combines these directly with the roll-up costs of its two children to produce its own roll-up cost.

Hash Join Specific Vectors and Values

A hash join consists of potentially three stages. Stage 1 involves taking rows produced by the right (inner) child, building a main memory hash table out of a cluster of rows that fits in memory and writing the remaining overflow clusters to disk. Stage 2 involves taking rows produced by the left (outer) child and, if the row in question belongs to a main memory cluster, probing the hash table built in stage 1; if the row in question belongs to an overflow cluster, it gets written to an overflow cluster on disk. Stage 3 joins corresponding overflow clusters produced in stages 1 and 2. If stages 1 and 2 did not produce overflow clusters, stage 3 does not need to execute.

Since no activity above the HJ operator can proceed until stage 1 completes, we regard stage 1 as blocking activity, so we place its resource usage in the blocking vector of the HJ preliminary cost:, i.e., $CPTB_{PP}$.

Preliminary costing produces separate vectors for resource usage in stage 2 and stage 3. We denote these two vectors as STG2 and STG3, respectively. For repeat counts greater than one, both vectors represent cumulative usage over all probes.

Preliminary costing also determines what fraction of STG2 pertains to first row production and what fraction of STG3 pertains to first row production. We denote these two fractions as frFrac2 and frFrac3 respectively. Preliminary costing produces its preliminary first and last row costs using the following formulas:

$$CPFR_{PP} = frFrac2*STG2 + {}^B frFrac3*STG3$$

$$CPLR_{PP} = STG2 + {}^B STG3$$

For HJ roll-up, however, we do not use $CPFR_{PP}$ and $CPLR_{PP}$ directly. Instead we use their constituent parts—frFrac1, frFrac2, STG1 and STG2—which preliminary costing has stored along with the traditional vectors of the preliminary cost.

Hash Join Roll-up Formulas

The formulas below indicate how to perform final cost roll-up for an HJ operator:

$$TC_{PR} = (TC_L + {}^V TC_R) + {}^V TC_{PP}$$

$$CPFR_{PR} = (frFrac2*{}^V((CPLR_L - {}^V CPFR_L) + {}^O STG2)) + {}^B(frFrac3*{}^V STG3)$$

$$CPLR_{PR} = ((CPLR_L - {}^V CPFR_L) + {}^O STG2) + {}^B STG3$$

$$CPTB_{PR} = (CPFR_L + {}^V CPTB_L) + {}^O(((((CPLR_R - {}^V CPFR_R)/{}^V RC-(CPLR_R)) + {}^O CPTB_{PP}) + {}^V CPFR_R) + {}^B CPTB_R)$$

The formula for $TC_{PR}$, as a total cost computation, involves regular vector addition.

In the computation of $CPLR_{PR}$, no ancestor activity can begin until the left child has produced at least one row, so the left child's first row cost belongs with the total blocking roll-up cost: $CPTB_{PR}$. The remaining portion of the left child's last row activity overlaps with stage 2, hence the term $((CPLR_L - {}^V CPFR_L) + {}^O STG2)$. Stage 3, however, can not proceed until stage 2 finishes, so blocking addition is used when adding its resource usage.

The computation for $CPFR_{PR}$ follows the same approach as the computation for $CPLR_{PR}$ with the additional complication of multiplying the stage 2 resource usage (including the left child's last row activity) and the stage 3 resource usage by the corresponding first row fractions—frFrac2 and frFrac3 respectively.

To compute $CPTB_{PR}$, one first recognizes that all of the right child's last row activity, except the portion necessary to produce the first row, overlaps with the HJ operator's blocking activity, hence the term $((CPLR_R - {}^V CPFR_R)/{}^V RC(CPLR_R)) + {}^O CPTB_{PP}$. (Note that dividing by $RC(CPLR_R)$ converts last row resource usage from a cumulative cost over all probes to an average cost per probe, and also note that the HJ operator's blocking activity, $CPTB_{PP}$, represents stage 1.) Next, $CPFR_R$ is added back, which was subtracted out earlier, and then the right child's blocking cost, $CPTB_R$, is added using blocking addition. As mentioned earlier, the left child's blocking activity includes the activity necessary to produce its first row, hence the term $CPFR_L + {}^V CPTB_L$. Since the left leg's blocking activity overlaps with the with the HJ operator, it is added using overlapped addition.

Several preferred embodiments of the present invention have been described. Nevertheless, it will be understood that various other modifications may be made without departing from the spirit and scope of the present invention. It will be understood, for example, that the invention is not limited to any particular implementation or programming technique and that the invention may be implemented using various techniques for implementing the functionality described herein. The invention may be implemented in any appropriate operating system using the appropriate programming languages and/or programming techniques. Thus, the present invention is not limited to the presently preferred embodiments described herein, but may be altered in a variety of ways which will be apparent to persons skilled in the art based on the present description.

We claim:

1. A process for predicting an elapsed time for executing a query, wherein a plan for executing the query includes a plurality of operators forming a query tree and at least one operator is a blocking operator, comprising:

assigning a preliminary cost to each operator;

combining the costs of at least some of the operators, including the at least one blocking operator; and converting the combined costs into a predicted elapsed time to execute the plan;

wherein the predicted elapsed time is the time predicted for returning the first row of the query's response.

2. A process for predicting an elapsed time for executing a query, wherein a plan for executing the query includes a plurality of operators forming a query tree and at least one operator is a blocking operator, comprising:

assigning a preliminary cost to each operator;

combining the costs of at least some of the operators, including the at least one blocking operator; and converting the combined costs into a predicted elapsed time to execute the plan;

wherein the predicted elapsed time is the time predicted for returning the last row of the query's response.

3. A process for predicting an elapsed time for executing a query, wherein a plan for executing the query includes a plurality of operators that will utilize resources during their execution, wherein the operators form a query tree and wherein at least two of the operators compete for the same resources, comprising:

assigning a preliminary cost to each operator;

combining the costs of at least the operators that compete for the same resources; and converting the combined costs into a predicted elapsed time to execute the plan while accounting for the effect of the competition for resources on the predicted elapsed time;

wherein the predicted elapsed time is the time predicted for returning the first row of the query's response.

4. A process for predicting an elapsed time for executing a query, wherein a plan for executing the query includes a plurality of operators that will utilize resources during their execution, wherein the operators form a query tree and wherein at least two of the operators compete for the same resources, comprising:

assigning a preliminary cost to each operator;

combining the costs of at least the operators that compete for the same resources; and converting the combined costs into a predicted elapsed time to execute the plan while accounting for the effect of the competition for resources on the predicted elapsed time;

wherein the predicted elapsed time is the time predicted for returning the last row of the query's response.

5. A process for predicting an elapsed time for executing a query, wherein a plan for executing the query includes a plurality of operators that will utilize resources during their execution, the operators form a query tree and at least one of the operators utilizes two of the resources in a non-concurrent manner, comprising:

assigning preliminary costs to the operators;

combining the costs of at least one of the operators that utilize resources in a non-concurrent manner with at least one other operator; and converting the combined costs into a predicted elapsed time to execute the plan while accounting for the effect of the non-concurrent utilization of resources;

wherein the predicted elapsed time is the time predicted for returning the first row of the query's response.

6. A process for predicting an elapsed time for executing a query, wherein a plan for executing the query includes a plurality of operators that will utilize resources during their execution, the operators form a query tree and at least one of the operators utilizes two of the resources in a non-concurrent manner, comprising:

assigning preliminary costs to the operators;

combining the costs of at least one of the operators that utilize resources in a non-concurrent manner with at least one other operator; and converting the combined costs into a predicted elapsed time to execute the plan while accounting for the effect of the non-concurrent utilization of resources;

wherein the predicted elapsed time is the time predicted for returning the last row of the query's response.

7. A process for predicting an elapsed time for executing a query in a database system having memory, wherein a plan for executing the query will use more of the memory than is physically available for the execution, and wherein the plan includes a plurality of operators forming a query tree, comprising:

assigning preliminary costs to the operators;

combining the costs of a plurality of the operators; and converting the combined costs into a predicted elapsed time to execute the plan while accounting for the effect of the insufficient memory on the predicted elapsed time;

wherein the predicted elapsed time is the time predicted for returning the first row of the query's response.

8. A process for predicting an elapsed time for executing a query in a database system having memory, wherein a plan for executing the query will use more of the memory than is physically available for the execution, and wherein the plan includes a plurality of operators forming a query tree, comprising:

assigning preliminary costs to the operators;

combining the costs of a plurality of the operators; and converting the combined costs into a predicted elapsed time to execute the plan while accounting for the effect of the insufficient memory on the predicted elapsed time;

wherein the predicted elapsed time is the time predicted for returning the last row of the query's response.

* * * * *